United States Patent [19]

Bos

[11] 4,375,909

[45] Mar. 8, 1983

[54] REAR PROJECTION SCREEN AND METHOD FOR THE PRODUCTION THEREOF

[76] Inventor: Cornelis Bos, Vossenschanslaan 54, 3445 Ec Woerden, Netherlands

[21] Appl. No.: 193,439

[22] Filed: Oct. 3, 1980

[30] Foreign Application Priority Data

Oct. 10, 1979 [NL] Netherlands ......................... 7907509
Jul. 24, 1980 [NL] Netherlands ......................... 8004273

[51] Int. Cl.$^3$ ............................................. G03B 21/56
[52] U.S. Cl. .................................... 350/117; 106/270; 350/126
[58] Field of Search .............................. 350/117, 126; 260/28.5 A, 28.5 AV, 28.5 R; 106/270

[56] References Cited

U.S. PATENT DOCUMENTS

| | | | |
|---|---|---|---|
| 4,053,208 | 10/1977 | Kato et al. ......................... | 350/117 |
| 4,066,332 | 1/1978 | Kato et al. ......................... | 350/126 |
| 4,083,626 | 4/1978 | Miyahara et al. ................... | 350/117 |
| 4,116,911 | 9/1978 | Miyahara et al. ............... | 350/117 X |

FOREIGN PATENT DOCUMENTS

| | | |
|---|---|---|
| 1097097 | 1/1961 | Fed. Rep. of Germany . |
| 1129312 | 5/1962 | Fed. Rep. of Germany . |
| 2614606 | 10/1976 | Fed. Rep. of Germany . |
| 872723 | 7/1961 | United Kingdom . |

*Primary Examiner*—Richard A. Wintercorn
*Attorney, Agent, or Firm*—William L. Botjer

[57] ABSTRACT

The invention relates to rear projection screens comprising a light-scattering layer of a mixture of 95–5% by weight of a wax-like substance having a low light-scattering power, such as paraffin, and 5–95% by weight of a wax-like substance having a high light-scattering power, such as white bees wax or microcrystalline paraffin. The light-scattering layer may be attached to one transparent carrier, e.g. to a glass or synthetic resin plate, or may be positioned between two transparent carriers. The rear projection screens according to the invention have a fine grain structure, may be adjusted to optimum values of half value angle and resolving power, and are remarkably free from scintillation. Further, the invention relates to a process for preparing the rear projection screens.

8 Claims, No Drawings

REAR PROJECTION SCREEN AND METHOD FOR THE PRODUCTION THEREOF

The invention relates to a rear projection screen comprising a light-scattering layer of a wax-like substance.

Such a rear projection screen, that is to say a projection screen for the reproduction of images projected thereon viewed on the rear side of the screen with respect to the projector has been described in the German Auslegeschrift No. 1,129,312. Such screens are used for example for displaying and viewing X-ray pictures or microfilm pictures of documents. The screen as described in said Auslegeschrift consists of two transparent planoparallel sheets or plates arranged parallel to each other at some distance, wherein the intermediate gap between said sheets or plates is completely filled with the light-scattering, wax-like substance which is capable of being melted above the temperature of use. The said German Auslegeschrift No. 1,129,312 discloses paraffin wax, ceresine wax, stearic acid and white bees wax as examples of substances that may be used as the light-scattering mass. According to said patent publication the screens described show a better scattering of the light and a better resolving power than opalized glass plates or glass plates coated with a thin film of a light-scattering composition of the dispersion type, for instance with a blend of Canada balsam and a crystallizing synthetic wax, a starch suspension or a dispersion of fine droplets or bubbles in a gelatin solution.

Moreover, rear projection screens are being used, which consist of a sheet or film of a transparent plastic the surface of which has been roughened or opaquefied by means of an applied layer containing a white or a coloured pigment.

These rear projection screens of the present type are subject to various requirements dependent on the application thereof. In case of relatively small screens to be viewed by only one person at a viewing distance which is several times larger than the largest dimension of the screen a relatively low scattering power will suffice. Such low diffusion screens are not suitable, however, for the projection of images to be viewed by a group of persons and, therefore, necessarily at different angles, and are not suitable either for the projection of images that are relatively large with respect to the viewing distance, as will be the case sometimes with rear projection screens for viewing microfiches or microfilms. In such a case the so-called "hot spot effect" occurs because the edges of the image are then viewed at a large angle (with respect to the normal) than the centre of the image. The projector lens will then be visible in the centre of the image as a light spot which is always present between the viewer and the projector lens even if the viewer will move sidewise with respect to the optical axis of the system.

The light cast on the screen by the projector will be partially reflected, partially absorbed and partially scattered or diffused, The viewer will only perceive the scattered or diffused light. The reflection (not solely at the projector side but also at the viewing side, that is of the incident light in not or not completely darkened rooms) as well as the absorption will increase when the scattering or diffusing power of the screen is increased so that it is of great importance that the scattering power of a rear projection screen will only be as large as required for the envisaged purpose.

Rear projection screens may be characterized by their half value angle. This is defined as the angle between the normal perpendicular to the surface of the screen and the direction in which the light intensity of the diffused light amounts to half of the intensity measured in the direction perpendicular to the screen when the screen is uniformly illuminated from the rear in a direction perpendicular to the screen. The larger the half value angle the more suitable the screen will be for viewing from directions differing from the normal. A large half value angle is, however, always associated with a small intensity of the diffused transmitted light.

As stated in German Auslegeschrift No. 1,129,312 the light-scattering power of the screens described therein and, consequently, their half value angle, may be adjusted by varying the thickness of the light-scattering layer. In practice, however, this variation is limited because it is very difficult to produce layers having a thickness of less than 0.1 mm as the transparent plates will then have to be plane very accurately. On the other hand, the resolving power of the screen decreases with increasing thickness of the layer.

Among the light-scattering substances mentioned in German Auslegeschrift No. 1,129,312 bees wax appears to show the largest light-scattering effect. Even a layer having a thickness of 0.1 mm, which is difficult to prepare, shows a light-scattering effect that is already too large for many applications. On the other hand, the scattering effect of a layer of paraffin wax having a thickness of even 0.5 mm is still too small for many applications, while the resolving power of a layer of such thickness leaves rather much to be desired. Ceresine wax exhibits about the same properties as paraffin wax whereas stearin is less suitable in view of its coarse structure.

The invention relates to a rear projection screen comprising a light-scattering layer of a wax-like substance, the light-scattering layer consisting of a mixture of 95–5% by weight of a wax-like substance having a low light-scattering power and 5–95% by weight of a wax-like substance having a high light-scattering power.

Variation of the composition and of the thickness of the light-scattering layer allows variation—within wide limits—of the half value angle of the present screens. This is an improvement with respect to the known screens comprising a light-scattering layer of a single wax-like substance, as the half value angle of the known screens could be varied only by variation of the thickness of the layer with simultaneous change of the resolving power of the layer, as the resolving power depends on the layer thickness. It was also found that the diffusing layers, according to the present invention have finer grain structures than the known layers consisting of a single wax-like substance.

The wax-like substances present in the light-scattering layer according to the invention may be natural waxes of vegetable or animal origin, synthetic waxes or petroleum waxes (paraffins). The wax-like substances should be substantially colourless. Very good results have been obtained with white bees wax and with microcrystalline paraffins as wax-like substances having a high light-scattering power, as well as with paraffin as a wax-like substance having a low light-scattering power. Also, the waxes may be modified—as described in German Offenlegungsschrift No. 2,614,606—by addition of a natural resin or synthetic resin so as to improve their mechanical strength.

Generally, the rear projection screens according to the invention have the wax-like light-scattering layer attached to a transparent carrier, for example to a plate of glass or of a transparent synthetic resin. The rear projection screens also may have the form described in German Auslegeschrift No. 1,129,312, where the light scattering layer is present between two transparent carriers and is attached to these. Also, an adhesive layer may be applied between the light-scattering layer and the transparent carrier or carriers, for example a photohardening adhesive of the type described in German Offenlegungsschrift No. 2,614,606.

The half value angle of the screens according to the invention may be adjusted to any desired value while also the thickness of the scattering layer and, consequently, the resolving power may be adjusted. By way of example, a layer consisting of 30% by weight of bees wax and 70% by weight of paraffin wax and having a thickness of 0.14 mm possesses about the same half value angle as a layer of paraffin wax having a thickness of 0.21 mm (about 15°).

By way of example the half value angles of some screens according to the invention have been indicated in the following table. For comparison purposes likewise the half value angles of screens produced with paraffin wax (0% by weight of bees wax) and with 100% by weight of bees wax have been indicated.

TABLE

| Percentage by weight of bees wax in the scattering layer | Half value angle at a thickness of the layer of | | | |
|---|---|---|---|---|
| | 0.14 mm | 0.21 mm | 0.28 mm | 0.35 mm |
| 10 | 12.5° | 16° | 19° | 21.5° |
| 20 | 13° | 17° | 20.4° | 23° |
| 30 | 15° | 19° | 22° | 24° |
| 40 | 17° | 21° | 25° | 29° |
| 50 | 19° | 25° | 29° | 35° |
| 60 | 21° | 29° | 31° | 39° |
| 0 | 12.4° | 15° | 17° | 20° |
| 100 | 28° | 34° | 39° | 45° |

From the above table it is apparent that within the range of the practical layer thicknesses of from 0.14 to 0.35 mm screens having half value angles between 20° and 28° cannot be produced from paraffin wax alone or from bees wax alone. For the adaptation of the half value angle one is then entirely dependent on the variation of the layer thickness so that the resolving power of the layer, which is dependent on the layer thickness, cannot be varied anymore. According to the invention not only the desired half value angle but also the resolving power (layer thickness) may be varied within wide limits.

Another important advantage of the screens according to the invention is that these screens possess a notably finer grain structure than the screens according to German Auslegeschrift No. 1,129,312 produced with only a single scattering substance, for instance bees wax. Further, the screens according to the invention are remarkably free from the annoying scintillation phenomenon.

When compared with rear screens comprising an opaquefied or pigmented plastic film or sheet the screens according to the invention have the advantage that they exhibit better scattering (diffusion) characteristics at the same light output. For, with the present screens the light intensity of the scattered light decreases far more gradually with an increasing angle between the viewing direction and the normal perpendicular to the surface. Consequently, even with the relatively low scattering screens according to the invention (thin layer; low percentage of wax-like substance having high light-scattering power) no true hot spot effect occurs. With white pigments used in the known screens the reflection is higher than in case of the present screens, and the use of coloured pigments causes absorption of part of the light spectrum, making these screens less suitable for the reproduction of coloured images.

The rear screens according to the invention are colourless and, consequently, do not influence the colour balance of the images projected thereon. They may be used for all known applications. For example. screens having half value angles between 20° and 25° are very well suited for copying motion pictures on a television recorder in which the film is projected via a plane surface mirror onto the rear side of the screen and the television camera takes the picture from the front side of the screen.

Of course, pigments may be added to the light-scattering layer but, generally, this is not necessary, as the screens according to the invention show only low reflection, and their light output (light transmission) is high.

The invention also relates to a method for producing a rear projection screen comprising a light-scattering layer of a wax-like substance, characterized by applying a melted mixture of 95-5% by weight of a wax-like substance having a low light-scattering power and 5-95% by weight of a wax-like substance having a high light-scattering power onto a transparent carrier or between two transparent carriers, and allowing to solidify the melted mixture.

In case the production of a screen whose light-scattering layer is present between two transparent carriers is contemplated, for example two glass plates, the two plates may for instance be kept together by means of clamps and may be adjusted to the desired distance by including spacers between the plates or sheets, which spacers are preferably of an elastic material, for instance rubber. The spacers are preferably elastic because the scattering mass will shrink upon solidification; elastic spacers will prevent the mass to get loose from the plates. Care has to be taken that when filling the gap between the plates or sheets no premature solidification occurs because otherwise an inhomogeneous layer might be formed. To that effect one may for instance use the method disclosed in German Auslegeschrift No. 1,129,312 and fill the gap between the plates with the melted mass by immersing the entire combination in the melted mass, allowing the mass to solidify and removing the solidified mass from the exterior surface.

Likewise one may seal the edges of a combination of two transparent plates kept at the desired distance, while leaving an inlet and an outlet opening in the sealing, heat the entire combination to a temperature above the melting point of the mass, fill the gap between the plates with the melted mass via the inlet opening, allow the mass to solidify, and seal the openings.

The solidification of the mixture applied to the transparent carrier or between the transparent carriers is effected by cooling. To that effect one may for instance introduce the combination filled with the liquid mixture or the carrier coated with the liquid mixture into a cooled chamber or lower the temperature of the chamber in which the liquid mixture was applied. Likewise one may contact the combination filled with the liquid mixture or the carrier coated with the liquid mixture with a cooling surface for instance consisting of glass or preferably of a metal. In accordance with this method one places the combination filled with the liquid mixture or the carrier coated with the liquid mixture for instance on a flat metal or glass plate. Optionally one may also place the plate onto the combination. Generally good results are obtained when the cooling plate is at room temperature although one may of course control the solidification time by varying the temperature of the plate.

It was found that for obtaining a fine and homogeneous grain structure, it is desirable to cause a relatively rapid solification of the melted mixture after having applied the mixture to the transparent carrier or between the transparent carriers. In practice, solidification times of from a few seconds to 5 minutes, in particular about 1-2 minutes have proved to be suitable.

When preparing screens whose light-scattering layer is present on one transparent carrier, the light-scattering layer obtained by applying the melted mixture to the carrier and allowing to solidify the mixture may not have the desired uniform thickness. In that case the layer may be given uniform thickness by means of a doctor device having a temperature above the melting point of the mixture of wax-like substances. The doctor device is passed over the wax-like layer at such a rate that the layer will melt at least partially at the point of contact with the doctor device. Of course, the doctor device may be in a fixed position and the wax-like substance coated carrier moved relative to the doctor device.

I claim:

1. Rear projection screen comprising a light-scattering layer of a wax-like substance, characterized in that the light-scattering layer consists of a mixture of 95-5% by weight of paraffin having a low light-scattering power and 5-95% by weight of a wax-like substance having a high light-scattering power selected from the group consisting of white bees wax and microcrystalline paraffin.

2. Rear projection screen according to claim 1, characterized in that the light-scattering layer is attached to at least one transparent carrier.

3. Rear projection screen according to claim 1, characterized in that the light-scattering layer is positioned between two transparent carriers and is attached to these.

4. Rear projection screen according to claim 2, characterized in that the light-scattering layer is attached to the transparent carrier or to the transparent carriers via a transparent adhesive layer.

5. A process for preparing a rear projection screen comprising a light-scattering layer of a wax-like substance, characterized by applying a melted mixture of 95-5% by weight of a paraffin having a low light-scattering power and 5-95% by weight of a wax-like substance having a high light-scattering power selected from the group consisting of white bees wax and microcrystalline paraffin to a transparent carrier or between two transparent carriers, and allowing the melted mixture to solidify.

6. The process according to claim 3, characterized by effecting the solidification of the mixture by contacting the transparent carrier or transparent carriers with a cooling surface.

7. The process of claim 5 or 6, characterized by effecting the solidification of the melted mixture in not more than 5 minutes.

8. The process of claim 5, characterized by applying the melted mixture of wax-like substances to a transparent carrier, allowing the mixture to solidify, and adjusting the layer to the desired uniform thickness by means of a doctor device having a temperature above the melting point of the wax-like substances.

* * * * *